United States Patent
Nayak et al.

(10) Patent No.: US 9,307,512 B2
(45) Date of Patent: Apr. 5, 2016

(54) SYSTEMS AND METHODS FOR OPTIMIZING NETWORK REGISTRATION FOR ALL SIMS OF A MULTI-SIM DEVICE USING CRITICALITY-BASED PRIORITIZATION SCHEMES

(71) Applicant: QUALCOMM Incorporated, San Diego, CA (US)

(72) Inventors: Shivank Nayak, San Diego, CA (US); Ajeet Kumar, Sitamarhi Bihar (IN); Shilpa Nagpal, Rajpura (IN); Rajesh Madhukar Patil, Hyderabad (IN); Venugopal Krishna Srinivasa Srungaram, Hyderabad (IN); Ravi Kanth Kotreka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 14/246,349

(22) Filed: Apr. 7, 2014

(65) Prior Publication Data

US 2015/0289221 A1 Oct. 8, 2015

(51) Int. Cl.
*H04W 60/00* (2009.01)
*H04W 88/06* (2009.01)
*H04W 48/18* (2009.01)
*H04W 88/02* (2009.01)

(52) U.S. Cl.
CPC .......... *H04W 60/005* (2013.01); *H04W 48/18* (2013.01); *H04W 88/06* (2013.01); *H04W 60/00* (2013.01); *H04W 88/02* (2013.01)

(58) Field of Classification Search
CPC .................................................... H04W 60/00
See application file for complete search history.

(56) References Cited

U.S. PATENT DOCUMENTS

| | | | |
|---|---|---|---|
| 8,433,318 B2 | 4/2013 | Krishnamoorthy et al. | |
| 8,543,109 B2 * | 9/2013 | Kim et al. | 455/435.1 |
| 2009/0156256 A1 | 6/2009 | Shi | |
| 2009/0156257 A1 | 6/2009 | Shi | |
| 2009/0215472 A1 | 8/2009 | Hsu | |
| 2011/0117962 A1 | 5/2011 | Qiu et al. | |
| 2011/0280166 A1 | 11/2011 | Nien et al. | |
| 2013/0148574 A1 | 6/2013 | Liu et al. | |
| 2013/0189985 A1 | 7/2013 | Mutya et al. | |
| 2013/0237223 A1 * | 9/2013 | Hietalahti et al. | 455/435.1 |
| 2015/0133130 A1 * | 5/2015 | Gupta et al. | 455/450 |

FOREIGN PATENT DOCUMENTS

EP 2461639 A1 6/2012

OTHER PUBLICATIONS

International Search Report and Written Opinion—PCT/US2015/024272—ISA/EPO—Jul. 23, 2015.

* cited by examiner

*Primary Examiner* — Michael T Vu
(74) *Attorney, Agent, or Firm* — The Marbury Law Group, PLLC

(57) ABSTRACT

Methods and devices are disclosed for enabling efficient network registration using a shared radio resource for at least a first and second SIM of a multi-SIM wireless communication device. After the end of a radio-off condition of the radio resource, the wireless device may identify services supported by each of the first and second SIMs, evaluate criticality of the supported services, determine which of the first and second SIM supports the service having the highest criticality, and prevent the other SIM from registering with its network before the SIM with the service of the highest criticality has successfully registered for service in its selected network.

19 Claims, 9 Drawing Sheets

SYSTEMS AND METHODS FOR OPTIMIZING NETWORK REGISTRATION FOR ALL SIMS OF A MULTI-SIM DEVICE USING CRITICALITY-BASED PRIORITIZATION SCHEMES

BACKGROUND

Multi-SIM (subscriber identification module) wireless devices have become increasing popular because of the versatility that they provide, particularly in countries where there are many service providers. For example, dual-SIM wireless devices may allow a user to implement two different plans or service providers, with separate numbers and bills, on the same device (e.g., business account and personal account). Also, during travel, users can obtain local SIM cards and pay local call rates in the destination country. By using multiple SIMs, a user may take advantage of different pricing plans and save on mobile data usage.

In various types of multi-SIM wireless communication devices, each modem stack associated with a subscription may store information provisioned by its respective network operator in a SIM, which may allow the SIM to support use of various different communication services. For example, various wireless networks may be configured to handle different types of data, use different communication modes, implement different radio access technologies, etc.

One type of multi-SIM wireless device, referred to as a dual-SIM dual active (DSDA) device, allows simultaneous active connections with the networks corresponding to two SIMs using separate transmit/receive chains associated with each SIM. Such separate components may provide convenience to a user, but may require high power consumption during operation. Another type of multi-SIM wireless device, referred to as a dual-SIM dual standby (DSDS) device, typically provides for a "standby" mode (i.e., idle mode) in which services associated with either SIM may originate or terminate a communication (e.g., a voice call or data call), and in which services associated with both SIMs may receive pages using a shared radio resource. By sharing a radio resource between the services enabled by both SIMs, a DSDS device may allow for a longer battery life than that of a DSDA device, as well as other benefits (e.g., lower cost of the device, avoiding receiver desense from co-located radios, etc.).

However, a disadvantage of sharing a radio resource between services enabled by two SIMs on the same device is that once a service enabled by one SIM registers on a selected network, that service may begin active communications and occupy use of the radio resource to the exclusion of services enabled on other SIMs. In particular, a service enabled by another SIM may be unable to perform initial carrier channel acquisition and signal strength measurements, and therefore be prevented from camping to a cell and registering in a selected network until a tune away period or termination of the active communication.

SUMMARY

Systems, methods, and devices of the various embodiments enable a multi-SIM wireless communication device to control use of a shared radio resource for efficient network registration of services supported by at least a first and a second SIM by evaluating criticality of communication services supported by each of the first SIM and the second SIM, granting use of the radio resource to a modem stack associated with the SIM having a higher criticality, determining whether the SIM having the higher criticality has successfully registered for service in a selected network, allowing the SIM having a lower criticality to register for service in response to determining that the SIM having the higher criticality has registered for service in the selected network, and preventing the SIM having the lower criticality from registering for service in response to determining that the SIM having the higher criticality has not successfully registered for service in the selected network.

In some embodiment systems, methods and devices, evaluating criticality of the supported communication services may include inputting a first service supported by the first SIM to a criticality index generator, outputting a criticality index value for the first service, inputting a second service supported by the second SIM to the criticality index generator, outputting a criticality index value for the second service, comparing the output criticality index values for the first and second services, and identifying the service associated with a highest criticality, in which the service with the highest criticality is the service with a lowest output criticality index value.

In some embodiment systems, methods and devices, evaluating criticality of the supported communication services may include accessing a predefined criticality list stored on the device, in which the predefined criticality list comprises at least one category of predefined time critical services and at least one category of predefined non-time critical services, and in which one of the at least one category of predefined time critical services is identified by a service characteristic. Evaluating criticality of the supported communication services may further include determining, for each of the supported services, whether the service is within the one of the at least one category of predefined time critical services based on whether the service matches the service characteristic.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
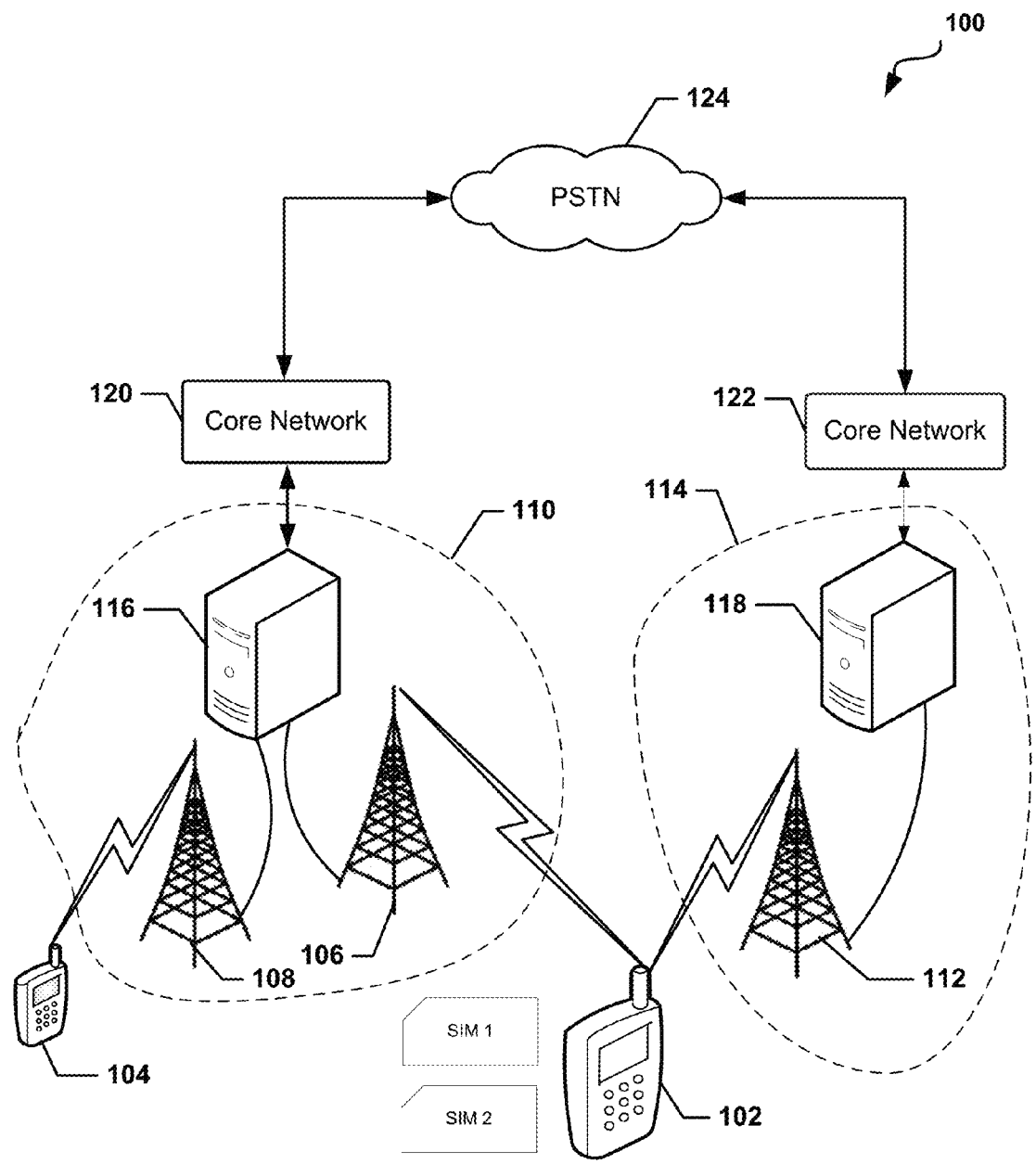
FIG. 1 is a communication system block diagram of a network suitable for use with various embodiments of the disclosure.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "wireless device," and "wireless communications device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM", "SIM card" and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM. For example, references to assigning a radio resource to a SIM (or granting a SIM radio access) means that the radio resource has been allocated to establishing or using a communication service with a particular network that is enabled by the information stored in that SIM.

As used herein, the terms "multi-SIM wireless communication device," "multi-SIM wireless device" "dual-SIM wireless communication device" "dual-SIM dual active device" and "DSDA device" are used interchangeably to describe a wireless device that is configured with more than one SIM and is capable of independently handling communications with networks of all subscriptions.

As used herein, the terms "wireless network," "cellular network," "system" "public land mobile network" and "PLMN" are used interchangeably to describe a wireless network of a carrier associated with a wireless device and/or subscription on a wireless device, and/or its roaming partners.

As used herein, the terms "cell," "beacon signal," "cell frequency," "BCCH (broadcast control channel) carrier frequency," "BCCH channel," and "cell channel" are used interchangeably to describe a base frequency signal which a network broadcasts from a base transceiver station (BTS), radio base station (RBS), or node B in order to advertise its presence, operator identity, and other necessary initial information.

As used herein, the terms "critical" and "time critical" are used interchangeably to describe communications in which relatively short delays may significantly degrade the user experience. Similarly, the terms "non-critical" and "non-time critical" are used interchangeably to describe communications in which relatively short delays may not have a significant effect on user experience.

As used herein, the terms "network registration" and "attachment" are used interchangeably to describe a messaging procedure in which the wireless device attempts to register its presence in a selected network following camping on a cell of such network by sending subscriber and device information stored in a SIM. Messages exchanged in particular registration procedures may vary based on elements including, but not limited to, the network operator, system architecture, communications protocol, radio access technology being used, etc. While reference may be made to registration and/or attachment procedures set forth in GSM standards (e.g., location update, IMSI/GPRS attach, etc.), they are provided merely as examples, and the claims apply to other types of cellular telecommunication networks and technologies.

The term "acquisition" when used herein with respect to a network or service on a network refers to performing idle mode functions including acquiring BCCH carrier frequencies associated with a SIM. Acquisition may involve scanning a list of previously-acquired PLMNs and their BCCH carrier frequencies and/or scanning frequency bands to identify channels which are BCCH carrier frequencies and above a threshold signal strength. Acquiring BCCH carrier frequencies may further include attempting to receive control channel information on the identified channels, such as detecting a tone on a Frequency Correction Channel (FCCH), decoding a burst of a Synchronization Channel (SCH), and reading system information from a BCCH.

Wireless communication networks are widely deployed to provide various communication services such as voice, packet data, broadcast, messaging, and so on. These wireless networks may be capable of supporting communications for multiple users by sharing the available network resources. Examples of such wireless networks include the Global System for Mobile Communications (GSM), Code Division Multiple Access (CDMA) networks, Time Division Multiple Access (TDMA) networks, and Frequency Division Multiple Access (FDMA) networks. Wireless networks may also utilize various radio technologies such as Wideband-CDMA (W-CDMA), cdma2000, Global System for Mobile Communications (GSM), etc.

A multi-SIM device exiting a radio-off state (e.g., powering on the device, turning off airplane mode, leaving an out-of-service area, etc.) may acquire and register for service with a selected network. Typically, in a DSDS wireless device in which two or more SIMs share a common radio resource, the order in which the wireless device uses the SIMs and their associated protocol stack to access a shared radio resource to perform system acquisition and registration processes with a network and service associated with a SIM may be "first-come first-serve." Alternatively, in some multi-SIM devices radio access may be granted to SIMs based on a user-selected priority, and/or based on a default priority assigned to the slots that house the SIM cards. As a result, the network registration order may be largely arbitrary, and may be inefficient for overall operation of the device.

For example, once a first SIM has selected and camped on a cell of a network, and registered its presence in the selected network using the shared radio resource, a service supported by the first SIM may initiate an active communication session. In this manner, other SIMs of the device may be prevented from selecting, camping on, and registering for service in their networks until the modem stack associated with the first SIM has released the radio resource or until there is a tune-away interval. In cases in which a service supported by one or more other SIM is more time-critical than the active communication service, the arrangement of radio use and network registration may be unnecessarily sacrificing availability of such time critical service.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, the embodiments are described below for GSM-type networks, but may be applied to networks using any other radio technology or protocol.

Wireless service carriers/service providers may establish public land mobile networks (PLMNs) to provide communication services to the public. Each PLMN may support cells that use one or many different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1×EV technology). An example GSM network may operate on any of a number of GSM bands (e.g., GSM 900, GSM 850, etc.), each of which cover multiple radio frequency (RF) channels identified in 3GPP TS 05.05, entitled "Digital cellular telecommunications system (Phase 2+); Radio transmission and reception (Release 1999)." Further, each GSM network typically operates on a specific set of RF channels in a specific GSM band. In describing the various embodiments, the terms "channel," and "frequency" may be used interchangeably and may refer to channels in GSM bands, and/or channels in other network bands.

A multi-SIM wireless device in which two or more SIMs (and their associated protocol stacks) share use of a single radio resource may be configured to operate in "standby mode." For example, in dual-standby mode on a DSDS device, the communication services enabled by each SIM may both enter idle mode, but while a communication service enabled by one SIM is transmitting or receiving data, the communication service enabled by the other SIM may be unavailable for use. Other multi-SIM wireless communication devices may be configured to operate more than two SIMs in standby mode, thereby sharing a radio resource among at least three SIMs. The SIMs in a multi-SIM wireless communication device may be associated with the same or different networks. Each SIM may generally be provisioned by a service provider with a predetermined list of preferred PLMNs from which the wireless device may receive service (i.e., a home PLMN and roaming partner PLMNs).

Although multi-SIM wireless communication devices offer a variety of options to the end user, they also necessitate efficient execution of complex tasks. In particular, DSDS wireless devices generally have separate modem stacks, each associated with a SIM, that share a single radio, such that if one modem stack is involved in an active communication the other modem stack is denied radio access.

Upon being powered on and/or recovering from a radio-off condition, a conventional wireless device may begin initial idle mode functions to connect to a network. In particular, a conventional wireless device may identify available cells in its vicinity by scanning the channels in a list of previously-acquired Broadcast Control Channel (BCCH) carrier or by scanning and measuring signal strength on the channels of each enabled frequency band, and may identify those channels that are above a threshold signal strength as being potential BCCH carrier. Upon detecting that a channel is a BCCH carrier, the wireless device typically tunes to the carrier frequency. On this frequency, the wireless device may read a Synchronization Channel (SCH) to obtain a base station identity code (BSIC), followed by reading the BCCH to obtain system information (e.g., a PLMN identifier).

A conventional wireless device may also select a desired PLMN based on a preferred PLMN list (i.e., automatic mode) stored in a SIM or by being presented with a list containing all networks found from the PLMN identifiers obtained on BCCH carrier frequencies, and may select one from the list stored in the SIM (i.e., manual mode). A conventional wireless device may attempt to find a suitable cell for camping by passing through the list in descending order of received signal strength and selecting the first BCCH carrier frequency that satisfies a set of requirements (e.g., that the cell is part of the selected PLMN, not barred by the service provider, etc.).

Once camped on a cell of its selected network (i.e., completion of initial idle mode functions), a conventional wireless device may attempt to register its presence in the selected network using subscriber information stored in the SIM. For example, to register for service in the CS domain of a GSM network, the wireless device may perform an IMSI attach procedure, as set forth in GSM standards. In summary, to begin an IMSI attach procedure the wireless device sends a location update request message and its IMSI stored in a SIM to a base station (e.g., base transceiver station (BTS)), which is forwarded to the mobile switching center (MSC) and visitor location register (VLR). The VLR may check its database to determine whether there is an existing record of the particular IMSI.

If no record is found, the MSC/VLR may forward the IMSI to the home location register (HLR) to verify and authenticate the IMSI. The HLR may obtain information from an authentication center to ensure that the IMSI is allowed on the network and allowed to subscriber services, and may return the IMSI and authentication to the MSC/VLR. Following a number of authentication steps, the MSC/VLR may send an acknowledgment message to the wireless device (e.g., a location update accept message), and may send an update message to the HLR which records the current MSC/VLR of the wireless device.

In another example registration, to register for service in the packet-switching (PS) domain of a GSM network, a wireless device may perform a General Packet Radio Service (GPRS) attach procedure, as also set forth in the GSM standards. In summary, the GPRS attach registers the wireless device with a serving GPRS support node (SGSN) of the network. To begin a GPRS attach, the wireless device may send an attach request to the SGSN, which may forward a packet temporary mobile subscriber identity (P-TMSI) associated with the subscription to the HLR. The HLR may ensure that the P-TMSI is authorized for the requested service. After authorization, the SGSN maps the P-TMSI to an assigned temporary logical link identifier (TLLI), stores the information in a database, and sends a reply to the wireless device with the assigned TLLI.

While a multi-SIM wireless communication device may be configured to share resources among different SIMs, since communications may be implemented by separate modem stacks, these conventional processes may be repeated for each SIM in order to successfully register with networks and services enabled by the information stored on all SIMs on cells of their respective PLMNs.

Various embodiments provide methods for controlling the order in which the registration processes outlined above are performed for services/networks enabled by the two or more SIMs sharing a radio resource on a multi-SIM device. In various embodiments, the registration order may be based on the time criticality of the services supported on each SIM of the multi-SIM device and/or the relative time criticality of the service enabled by one SIM compared to services enable by the other SIMs. Specifically, various embodiments provide methods of identifying a SIM associated with a time critical service, and preventing SIMs not associated with that service from registering for service in their networks, and/or from initiating an active communication, until at least one other SIM (and it associated modem stack) associated with a time critical service has camped and/or registered for service on its selected network. In this manner, various embodiments may decrease overall network acquisition and registration time across all SIMs of the multi-SIM device, thereby providing improved user experience and modem performance.

The embodiments may be implemented in any of a number of service states on SIMs that are associated with non-time critical services. While the various embodiments generally prevent SIMs associated with non-time critical services from performing network registration steps, in some embodiments such SIMs may also be prevented from performing any idle mode functions that would utilize the shared radio resource (i.e., prevents channel acquisition, PLMN selection, cell selection). In other embodiments, the SIMs associated with non-time critical services may be permitted to perform all idle mode processes, including registration, and may hold any mobile originating call requests received through an application or user interface until the SIM associated with a time critical service has completed its registration process. However, since standby mode may allow the SIMs of non-time critical services to receive pages and broadcast signals, such SIMs may still occupy use of the shared radio resource if they receive a page for a mobile terminating call.

FIG. 1 illustrates a wireless network system 100 suitable for use with various embodiments of the disclosure. Wireless devices 102, 104 may be configured to establish wireless connections with cell towers or base stations of one or more radio access networks. For example, the wireless devices 102, 104 may transmit/receive data using base stations 106, 108, which may be part of a network 110, as is known in the art. The wireless device 102 may further be configured to transmit/receive data through base station 112, which may be part of a different network 114.

The wireless networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, G-3, G-4, or other protocols that may be used in a wireless communications network or a data communications network. The networks 110, 114 may use the same or different wireless interfaces and/or physical layers. In some embodiments, the base stations 106, 108, 112 may be controlled by one or more base station controllers (BSC) 116, 118. For example, the base stations 106, 108, the BSC 116, 118, and other components may form the network 110, as is known in the art. Alternate network configurations may also be used and the embodiments are not limited to the configuration illustrated. For example, in other embodiments, the functionality of the BSC 116 and at least one of the base stations 106, 108 may be collapsed into a single "hybrid" module having the functionality of these components.

In various embodiments, the wireless device 102 may simultaneously access core networks 120, 122 after camping on cells managed by the base stations 106, 112. The wireless device 102 may also establish connections with Wi-Fi access points, which may connect to the Internet. While the various embodiments are particularly useful with wireless networks, the embodiments are not limited to wireless networks and may also be implemented over wired networks with no changes to the methods.

In the wireless network system 100, the wireless device 102 may be a multi-SIM wireless communication device that is capable of operating on a plurality of SIMs. For example, the wireless device 102 may be a dual-SIM wireless communication device. Using dual-SIM functionality, the wireless device 102 may simultaneously access the two core networks 120, 122 by camping on cells managed by the base stations 106, 112. The core networks 120, 122 may be interconnected by public switched telephone network (PSTN) 124, across which the core networks 120, 122 may route various incoming and outgoing communications to the wireless device 102.

The wireless device 102 may make a voice or data call to a third party device, such as the wireless device 104, using a service enabled by information stored in one of the SIMs, as well as the modem stack associated with that SIM, via the shared radio resource. The wireless device 102 may also receive a voice call or other data transmission from a third party in a similar manner. The third party device (e.g., wireless device 104) may be any of a variety of devices, including, but not limited to, a mobile phone, laptop computer, PDA, server, etc.).

Some or all of the wireless devices 102 may be configured with multi-mode capabilities and may include multiple transceivers for communicating with different wireless networks over different wireless links/radio access technologies (RATs). For example, a DSDS wireless device 102 may be configured to camp two SIMs on cells of two different networks though the same transmit/receive chain (i.e., radio resource) and communicate over the two wireless data networks on different subscriptions.

For clarity, while the techniques and embodiments described herein relate to a wireless device configured with at least one GSM subscription, they may be extended to subscriptions on other radio access networks (e.g., cdma2000, UMTS, WCDMA, LTE, etc.).

Figure 2A:
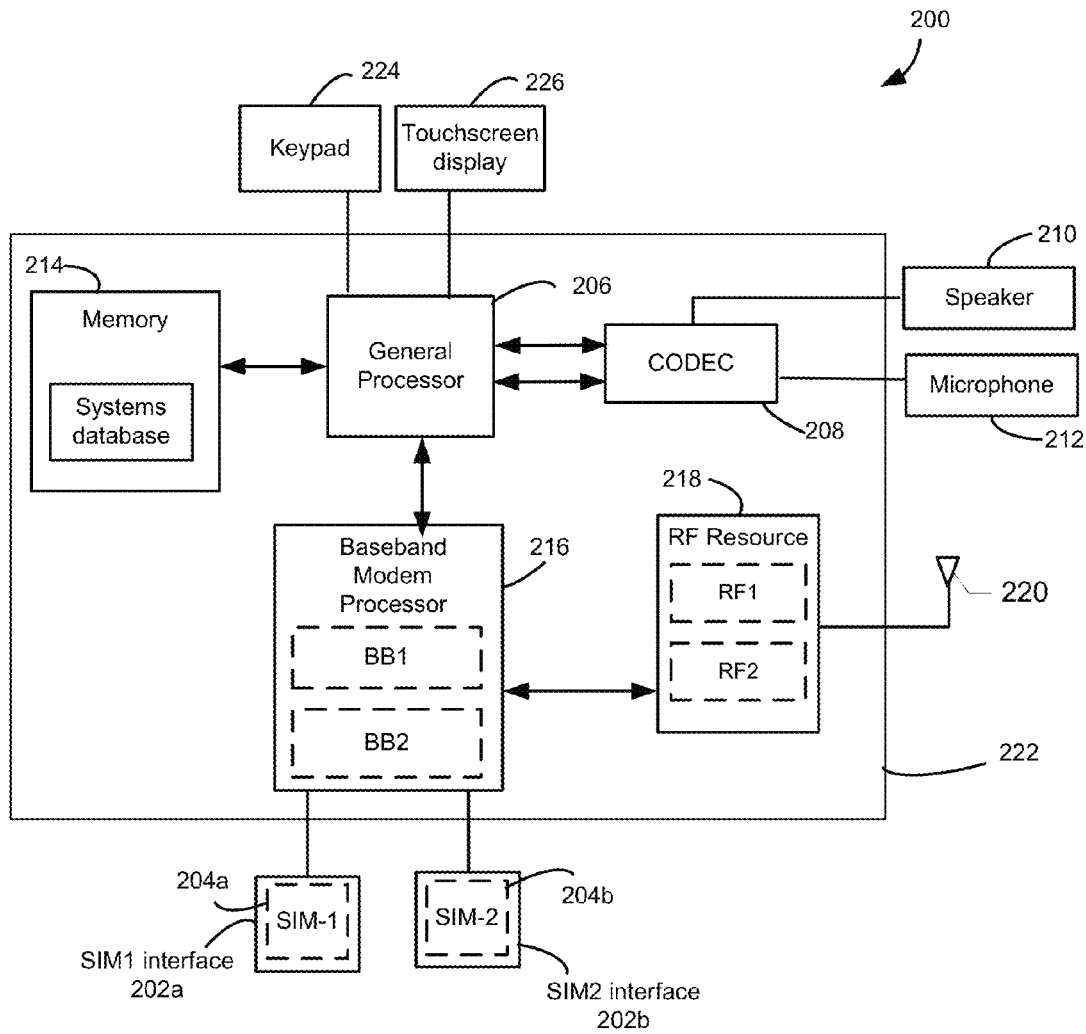
FIG. 2A is a component block diagram illustrating a dual-SIM dual standby wireless communications device according to various embodiments.

FIG. 2A is a functional block diagram of a multi-SIM wireless device 200 that is suitable for implementing the various embodiments. According to various embodiments, the wireless device 200 may be similar to one or more of the wireless devices 102, 104 (refer to FIG. 1). The wireless device 200 may include a first SIM interface 202a, which may receive a first identity module SIM-1 204a that is associated with a first subscription. The wireless device 200 may also include a second SIM interface 202b, which may receive a second identity module SIM-2 204b that is associated with a second subscription.

A SIM in the various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM card may have a CPU, ROM, RAM, EEPROM and I/O circuits. A SIM used in the various embodiments may contain user account information, an IMSI a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number may be printed on the SIM card for identification.

Wireless device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store a database or list of services or service categories that have been predefined as time critical or non-time critical, as described in the disclosure (e.g., with reference to FIGS. 5A and 5B).

The general processor 206 and the memory 214 may each be coupled to at least one baseband modem processor 216. Each SIM in the wireless device 200 (e.g., SIM-1 202a and SIM-2 202b) may be associated with a baseband-RF resource chain. A baseband-RF resource chain may include baseband modem processor 216, which may perform baseband/modem functions for communications on at least one SIM, and include one or more amplifiers and radios, referred to generally herein as RF resource 218, which is coupled to an antenna 220. The RF resource 218 may perform transmit/receive functions for at least one SIM of the wireless device 200. In some embodiments, the RF resource 218 may include separate transmit and receive circuitry, or may include a transceiver that combines transmitter and receiver functions. The RF resource 218 may be coupled to the wireless antenna 220 for sending and receiving RF signals.

A DSDS wireless device 200 may have a common baseband-RF resource chain for all SIMs in the wireless device (i.e., a single baseband modem processor 216, a single RF resource 218, and a single antenna 220). In other embodiments, different SIMs may be associated with separate baseband-RF resource chains that include physically or logically separate baseband modem processors (e.g., BB1, BB2), each of which may be coupled to a common RF resource 218 (i.e., a single device that performs transmit/receive functions for all SIMs on the wireless device).

In particular embodiments, the general processor 206, memory 214, baseband modem processor(s) 216, and RF resource 218 may be included in a system-on-chip device 222. The first and second SIMs 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless device 200 may include, but are not limited to, a keypad 224, a touchscreen display 226, and a microphone 212.

In some embodiments, the keypad 224, the touchscreen display 226, the microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 200 to enable communication between them, as is known in the art.

Figure 2B:
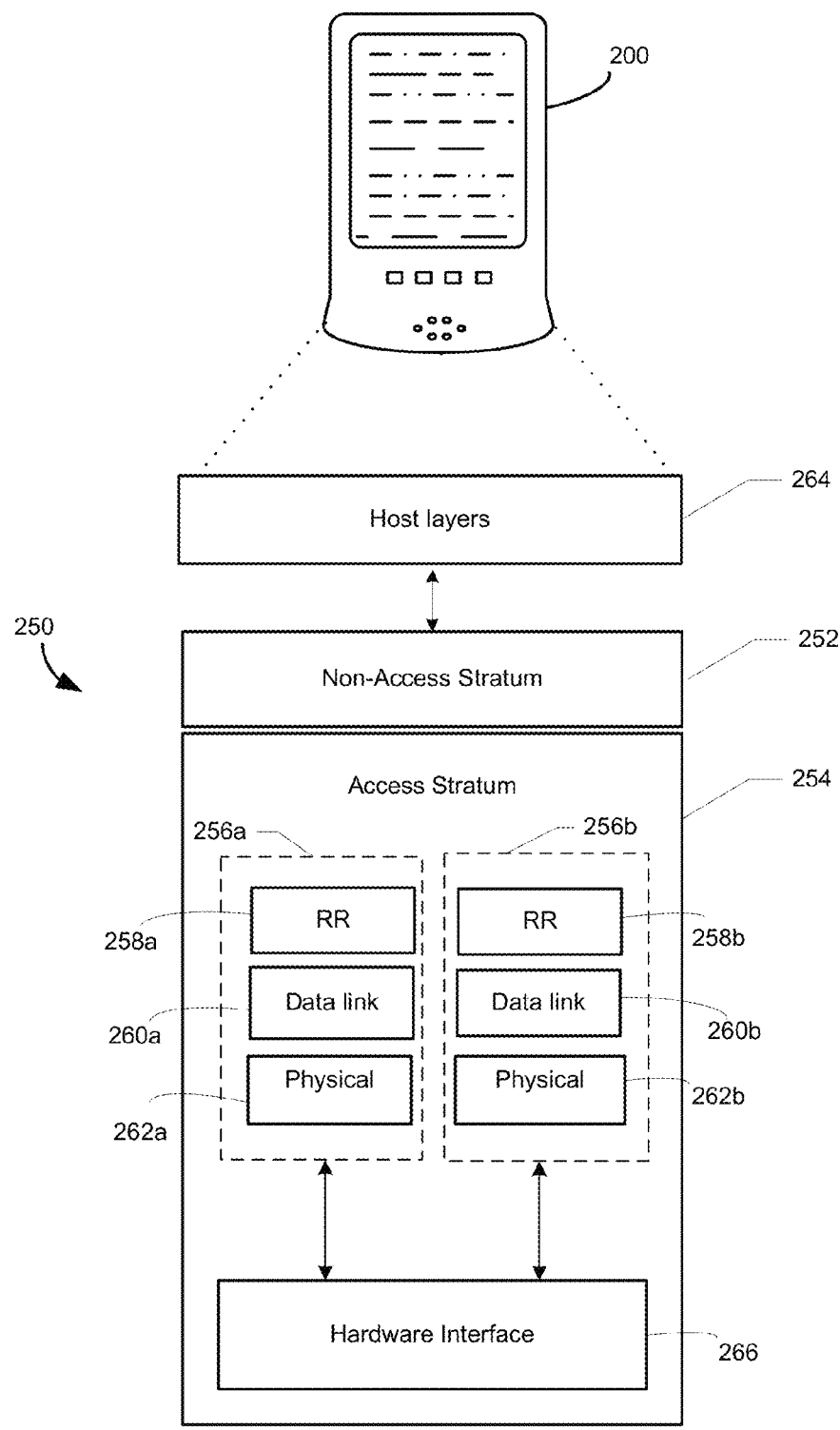
FIG. 2B is a system architecture diagram illustrating example protocol layer stacks implemented by the dual-SIM wireless communication device of FIG. 2A.

With reference to FIGS. 1-2B, the wireless device 200 may have a layered software architecture 250 to communicate over access networks associated with SIMs. The software architecture 250 may be distributed among one or more processors, such as baseband modem processor 216. The software architecture 250 may also include a Non Access Stratum (NAS) 252 and an Access Stratum (AS) 254. The NAS 252 may include functions and protocols to support traffic and signaling between SIMs of the wireless device 200 (e.g., SIM-1 204a, SIM-2 204b) and their respective core networks. The AS 254 may include functions and protocols that support communication between the SIMs (e.g., SIM-1 204a, SIM-2 204b) and entities of their respective access networks (such as a MSC if in a GSM network).

In the multi-SIM wireless device 200, the AS 254 may include multiple protocol stacks, each of which may be associated with a different SIM. For example, the AS 254 may include protocol stacks 256a, 256b, associated with SIMs 204a, 204b, respectively. Although described below with reference to GSM-type communication layers, the protocol stacks 256a, 256b may support any of variety of standards and protocols for wireless communications. Each protocol stack 256a, 256b may respectively include Radio Resource management (RR) layers 258a, 258b. The RR layers 258a, 258b may be part of Layer 3 of a GSM signaling protocol, and may oversee the establishment of a link between the wireless device 200 and associated access networks. In various embodiments, the NAS 252 and RR layers 258a, 258b may perform various functions to search for wireless networks and to establish, maintain, and terminate calls.

In some embodiments, each RR layer 258a, 258b may be one of a number of sub-layers of Layer 3. Other sub-layers may include, for example, connection management (CM) sub-layers (not shown) that route calls, select a service type, prioritize data, perform QoS functions, etc.

Residing below the RR layers 258a, 258b, protocol stacks 256a, 256b may also include data link layers 260a, 260b, which may be part of Layer 2 in a GSM signaling protocol. Data link layers 260a, 260b may provide functions to handle incoming and outgoing data across the network, such as dividing output data into data frames and analyzing incoming data to ensure it has been successfully received. In some embodiments, each data link layer 260a, 260b may contain various sub-layers (e.g., media access control (MAC) and logical link control (LLC) layers (not shown)). Residing below the data link layers 260a, 260b, the protocol stacks 256a, 256b may also include physical layers 262a, 262b, which may establish connections over the air interface and manage network resources for the wireless device 200.

While the protocol stacks 256a, 256b provide functions to transmit data through physical media, the software architecture 250 may further include at least one host layer 264 to provide data transfer services to various applications in the wireless device 200. In some embodiments, application-specific functions provided by the at least one host layer 264 may provide an interface between the protocol stacks 256a, 256b and the general processor 206. In other embodiments, the protocol stacks 256a, 256b may each include one or more higher logical layers (e.g., transport, session, presentation, application, etc.) that provide host layer functions. In some embodiments, the software architecture 250 may further include in the AS 254 a hardware interface 266 between physical layers 262a, 262b and the communication hardware (e.g., one or more RF transceivers).

The SIMs and associated protocol stacks of a multi-SIM device (e.g., the wireless device 200) may be configured and provisioned to support a variety of communication services that fulfill different user requirements. Further, a particular SIM and associated protocol stack may be configured with the ability to execute different signaling procedures in order to use the communication mode required for accessing a domain of the core network associated with these services and for handling data thereof. Each service may be classified as either time critical or non-time critical based on characteristics including, but not limited to, the associated communication mode.

For example, a GSM network may have a circuit-switched (CS) domain and a packet-switched (PS) domain to support services that use circuit-switched data and packet-switched data, respectively. Various qualities of these communication modes may render them favorable or unfavorable for particular services. For example, circuit switching is connection-oriented, and involves a dedicated channel to the destination end point, providing exclusive use of the circuit for the duration of the communication. Circuit switching guarantees quality of service by enabling reliability that data will arrive with constant bandwidth and at constant delay, in the order in which it was transmitted. However, regardless of the amount of data actually transmitted, an originating device will generally be charged for the duration of the call. For services in which such a dedicated channel is unnecessary, circuit switching may be expensive and waste network resources. Example services for which circuit switching may be ideal include voice calls over the public switched telephone network, communications using Integrated Services for Digital Network (ISDN) standards, optical fiber-based transport network services, and other connection-oriented services that may require guaranteed quality of service and reliability.

Packet switching involves using shared network resources instead of channels dedicated for use by a particular communication. In packet-switched communications, network resources are "always on" but are allocated only when needed for data transfer, after which they are released. Packet switching allows users to obtain connectivity without lengthy setup, and provides higher speed transfer than circuit switching. However, since bandwidth is shared between multiple communication sessions, packet-switched communication does not provide the guaranteed quality of service in circuit switching. Example services for which packet switching may be ideal include those supporting email, broadcast, and web browsing applications, as well as other applications in which data is transmitted in bursts as opposed to continuous data transfer.

Various embodiments may involve prioritizing network registration between SIMs of a multi-SIM device based on the criticality of services supported by the SIMs of the wireless device. The time criticality of services in the various embodiments may be determined in a variety of ways. For example, criticality of a service may be based on how a service has been requested. In another example, criticality may be based on one or more known characteristics of the communications in such services. For example, a known characteristic of various services may be how each service moves data across the network (i.e., circuit switching or time switching). In some embodiments, services that use circuit-switched communications may be predefined as time critical, while services using packet-switched communications may be predefined as non-time critical.

Figure 3:
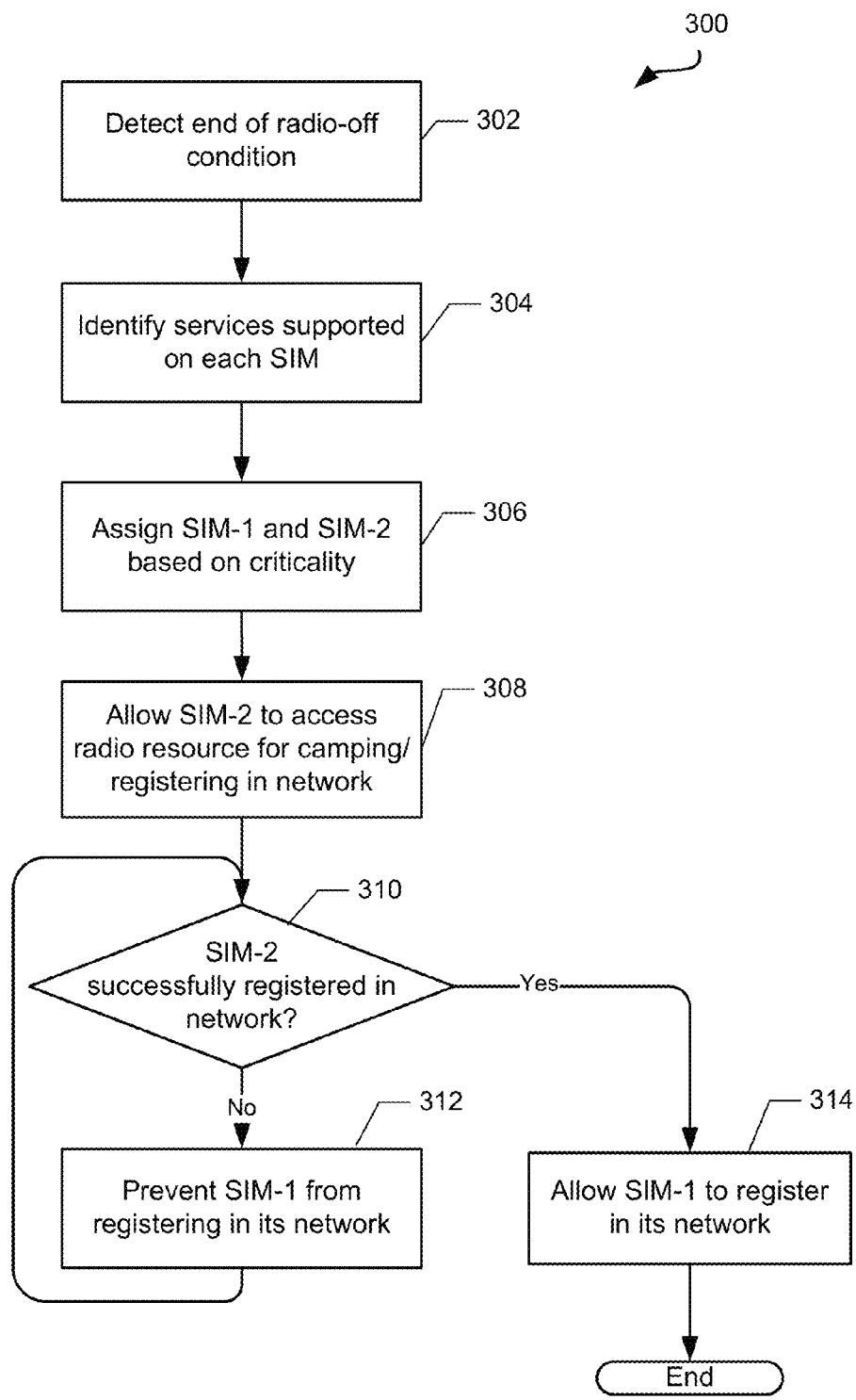
FIG. 3 is a process flow diagram illustrating a method for optimizing the order of network registration by the SIMs of a dual-SIM wireless communication device according to various embodiments of the disclosure.

FIG. 3 illustrates a method 300 of prioritizing SIM registration (i.e., registration for the services enabled by the information stored on the SIM) on a DSDS wireless device configured with two SIMs after a radio-off condition has ended. With reference to FIGS. 1-3, the operations of the method 300 may be implemented by one or more processors of the wireless device 200, such as the general processor 206 and/or the baseband modem processor 216, or a separate controller (not shown) that may be coupled to memory and to the baseband modem processor(s) 216.

In block 302, the wireless device processor may detect that a radio-off condition on the wireless device has ended, such by the wireless device being powered on, exiting airplane mode, or sensing that RF signals are being received after being in a complete out-of-service condition (e.g., in an elevator), and therefore that the radio resource may be available for use. In some embodiments, the wireless device processor may also allow one or more SIMs to begin initial idle mode functions to select and camp on a cell of a PLMN according to the conventional priority on the device. For example, depending on the particular SIM and information available prior to the radio-off state, initial idle mode functions may involve accessing a list of previously acquired BCCH carrier frequencies, scanning all supported frequency bands for BCCH carriers, and/or selecting a PLMN from information read on BCCH carrier frequencies based on a predefined priority list.

In block 304, the wireless device processor may identify the communication services supported by the information stored on each SIM. In block 306, the wireless device processor may evaluate the relative criticality of identified communication services and assign the SIM supporting less time critical services as the first SIM ("SIM-1"), with the SIM supporting more time critical services as the second SIM ("SIM-2"). The references to the first SIM/SIM-1 and second SIM/SIM-2 are arbitrary and used merely for the purposes of describing the embodiments, and the wireless device processor may assign any indicator, name or other designation to differentiate the SIMs based on criticality of their supported services. The criticality of supported services may be based on a criticality index generator, a predefined criticality list stored in memory, and/or a combination of these methods, as discussed in the disclosure (e.g., with reference to FIGS. 4, 5A and 5B).

In block 308, the wireless device processor may grant use of the shared radio resource to the modem stack associated with SIM-2 in order to select a network, and camp on an acceptable cell, and register for service in the selected network. Alternatively, if the modem stack associated with SIM-2 has already performed some or all initial idle mode functions (i.e., already camped to a cell of the selected network), block 308 may only involve registration of the service enabled by SIM-2 in its selected network.

The processes involved in successful network registration may depend on the particular network and services associated with SIM-2. For example, following initial system acquisition and cell selection, the modem stack and service associated with SIM-2 may perform an attach procedure. In some examples, the modem stack and service associated with SIM-2 may perform one or both of an IMSI attach and a GPRS attach, which may allow the device to send and receive circuit switched and packet switched data, respectively, over the network.

In determination block 310, the wireless device processor may determine whether the modem stack and service associated with SIM-2 has successfully registered in its selected network. This determination may be made, for example, by determining whether an attach acknowledgment message has been received from the MSC and/or SGSN of the selected network. If the modem stack and service associated with SIM-2 has not completed network registration (i.e., determination block 310="No"), then in block 312, the wireless device processor may prevent SIM-1 from performing its own network registration by preventing the modem stack associated with SIM-1 from accessing the shared radio resource. The wireless device processor repeats the process of determining whether the modem stack and service associated with SIM-2 has successfully registered in its selected network in determination block 310 until such registration occurs.

In some embodiments, a countdown timer may be started upon determining that the modem stack and service associated with SIM-2 has not successfully registered, and the wireless device processor may wait until the timer expires before again determining whether SIM-2 has successfully completed network registration in determination block 310. In other embodiments (not shown), a counter may be incremented after each repetition of this determination in determination block 310 so that upon reaching a preset limit the wireless device processor may allow the modem stack associated with SIM-1 to register with its network in block 314, regardless of whether the modem stack and service associated with SIM-2 has successfully registered in its network.

If the modem stack and service associated with SIM-2 has successfully registered in its network (i.e., determination block 310="Yes"), then in block 314, the wireless device processor may grant use of the shared radio resource to the modem stack associated with SIM-1 to register for service in its selected network. In some embodiments, the modem stack of SIM-1 may not have performed the initial idle mode functions, and block 314 may therefore also include performing channel acquisition, PLMN selection, and cell selection steps prior to the steps for registering in the selected network.

In various embodiments, the PLMN selection steps during initial idle mode operation may cause the modem stacks of SIM-1 and SIM-2 to acquire the BCCH carrier frequency of, and subsequently register for service on, the same network. In other embodiments, the modem stacks of SIM-1 and SIM-2 may acquire and register with different networks.

Criticality of the various services supported by each SIM may be determined in multiple different ways. For example, whether a service is time critical or non-time critical may be an ad hoc determination made by the wireless device processor at the time of executing the operations of the method 300. In such embodiments, the amount of time for each execution of the method 300 may be increased to perform the ad hoc determination. However, using such a method the wireless device processor need not have prior knowledge of the characteristics of the service, and therefore may be configured to accommodate a wide range of both existing and future services.

Figure 4:
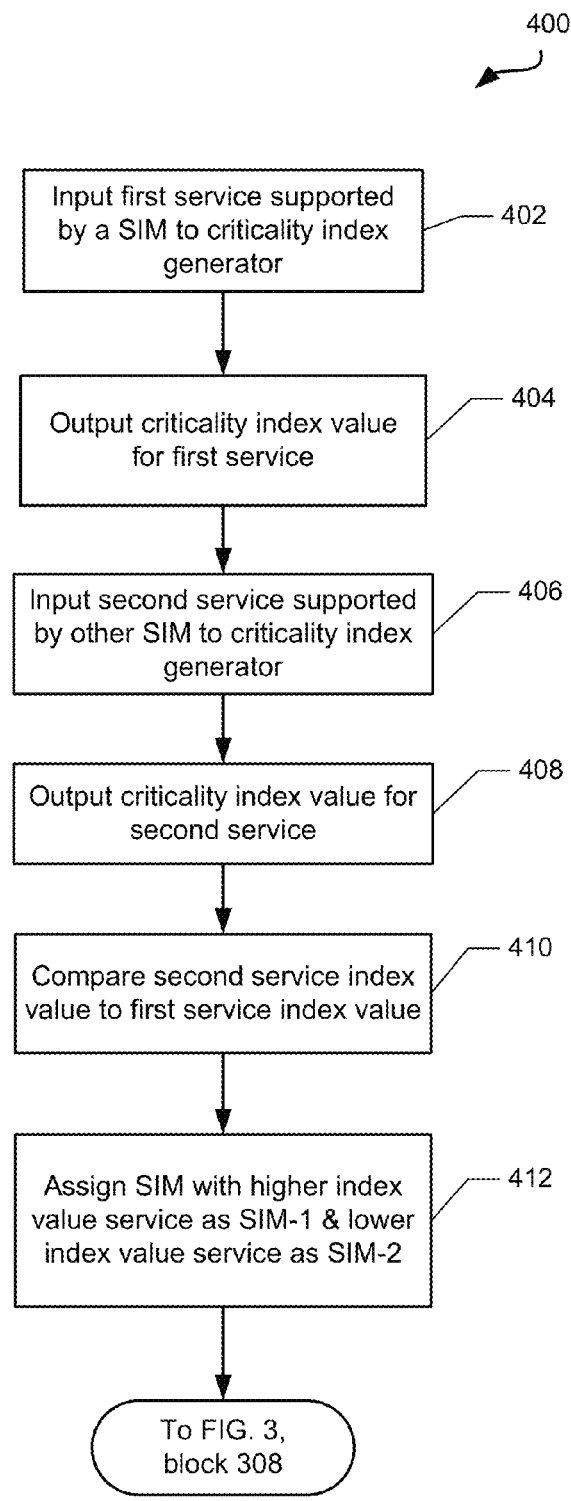
FIG. 4 is a process flow diagram illustrating a method for assigning priority to SIMs of a dual-SIM wireless communication device based on criticality according to various embodiments of the disclosure.

FIG. 4 illustrates a method 400 of implementing block 306 of the method 300 with reference to FIG. 3. With reference to FIGS. 1-4, in various embodiments, criticality may be based on ad hoc determinations using a criticality index generator. In some embodiments, the criticality index generator may be a software engine, program, subroutine, or other set of processor-executable instructions. The criticality index generator may be configured to receive data, parameters or arguments that identify a particular service. Based on how the service is being initiated and/or how it has recently been initiated, the criticality index generator may return a criticality index value between 0 and N. In various embodiments, an index value of 0 may represent the most time critical service, with a decrease in criticality as the index value increases. For example, a service that was last initiated by the user may be given a higher priority, and thus a lower index value, than a service recently initiated by an application. By using the amount of user involvement as a meter of criticality, the criticality index generator may be able to prioritize between instances of the same service enabled by information stored in different SIMs. For example, the user may have opened a browser window to initiate a first data download service, which may therefore be given a lower criticality index value than a second data download service that was initiated to perform a background data sync requested by an application.

In block 402 of the method 400, data identifying a service supported by one of the SIMs may be input to the criticality index generator. If, for example, the same service is supported on both SIMs, the identifying data may also include information to specify the SIM with which it is associated. In block 404, a criticality index value corresponding to the first input service may be output (e.g., a value of 0 to N), and may be stored in temporary memory (e.g., cache) by the wireless device processor (e.g., the general processor 206, the baseband modem processor 216, a separate controller, and/or the like). In block 406, data identifying the service supported by the other of the two SIMs may be input to the criticality index generator. In block 408, a criticality index value corresponding to the second input service may be output (e.g., a value of 0 to N). In block 410, the wireless device processor may access the cached criticality index value for the first service and compare the value to the output criticality index value for the second service. In block 412, the wireless device processor may assign the SIM associated with the service having a higher index value as SIM-1, with the lower index value SIM as SIM-2. The wireless device processor may return to block 308 of the method 300.

In some embodiments, a list, database, or other data structure identifying services and/or characteristics of services predefined as time critical or non-time critical may be stored on the DSDS device. In some embodiments, the list or data structure may be stored in a memory location accessible to the wireless device processor. Such predefined criticality information may be used instead of or in addition to the criticality index engine to prioritize between services on the two SIMs sharing a radio resource.

In particular embodiments, the predefined criticality of various services may be based on a known characteristic that serves as a proxy for time criticality, such as the use of circuit switching compared to packet switching. For example, a stored list may predefine circuit-switched communications as being time critical, and packet-switched communications as being non-time critical. In some embodiments, the stored list may specify various packet-switched and circuit-switched services. In other embodiments, the wireless device processor may be required to determine whether each service may be categorized as packet switched or circuit switched in order to determine its criticality. Thus, while the amount of time required for obtaining a criticality determination from an existing list may be lower than that of running the criticality index generator, recognition of the service and/or knowledge of its characteristics may be required in such embodiments. Further, such a list may not prioritize between services that fall within the same predefined time critical or non-time critical category (i.e., have the same characteristics). Therefore the various embodiments may benefit from utilizing both the stored list of predefined time critical and non-time critical service characteristics and the criticality index generator.

Figure 5A:
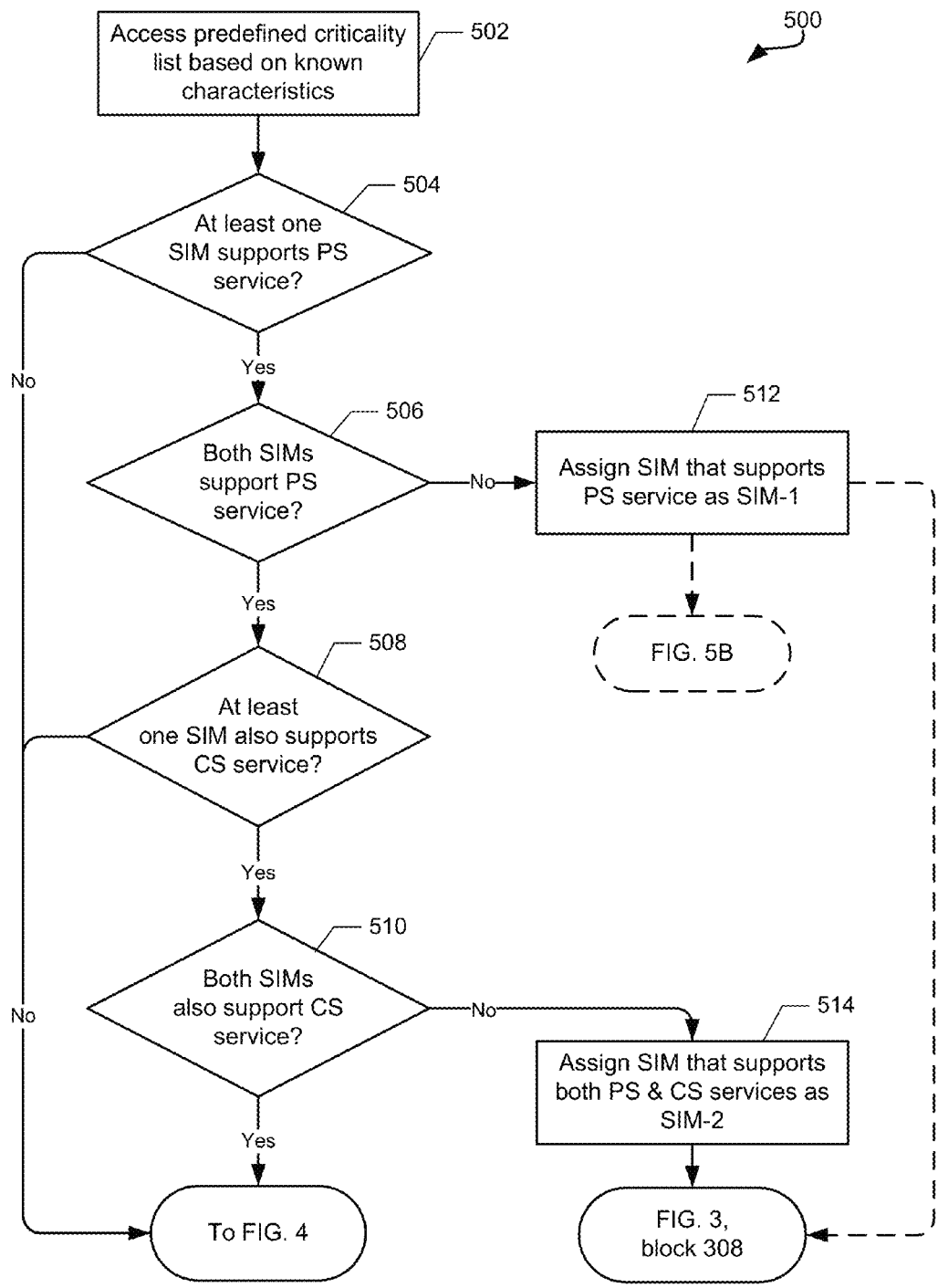
FIG. 5A is a process flow diagram illustrating a method for assigning priority to SIMs of a dual-SIM wireless communication device based on criticality according to various embodiments of the disclosure.
Figure 5B:
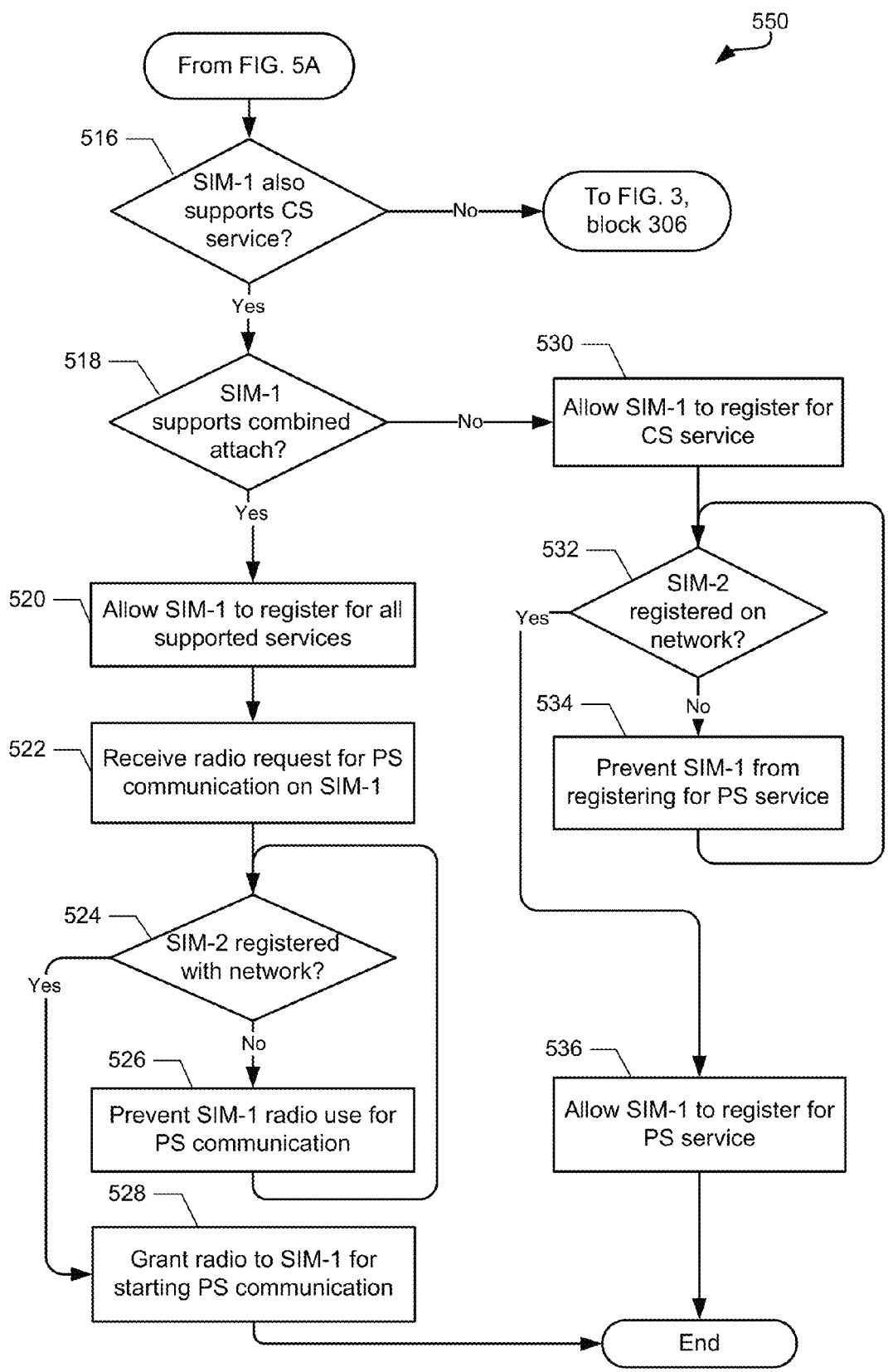
FIG. 5B is a process flow diagram illustrating a method for optimizing radio resource access by SIMs that are assigned priority according to FIG. 5A.

FIG. 5A illustrates a method 500 of implementing the operations of block 306 of the method 300 with reference to FIG. 3. While method 500 refers to use of circuit switching (CS) and packet switching (PS) by services, these are provided merely as examples of predefined non-time critical and time critical service characteristics, respectively, which may be categories in the stored predefined criticality list. Other example characteristics may include, without limitation, the ability to transmit/receive voice data, whether the service provides group call capability (e.g., a push-to-talk (PTT) service), the types of media that may be transferred using a service, whether applications using the service involve synchronous or asynchronous communications, and more.

With reference to FIGS. 1-5A, in block 502, the wireless device processor (e.g., the general processor 206, the baseband modem processor 216, a separate controller, and/or the like) may access a predefined criticality list based on known service characteristics. In determination block 504, the wireless device processor may determine whether at least one of the SIMs supports a service that uses packet switching. If neither SIM supports a packet-switched service (i.e., determination block 504="No"), the wireless device processor may assume that both SIMs support circuit-switching services and/or support services using unknown communication modes. Therefore, the wireless device processor may prioritize the services using the criticality index generator in the method 400.

If at least one SIM supports a service that uses packet switching (i.e., determination block 504="Yes"), in determination block 506, the wireless device processor may determine whether both SIMs support services that use packet switching. If both SIMs support services that use packet switching (i.e., determination block 506="Yes"), the wireless device processor may determine whether at least one SIM supports a service that uses circuit switching in addition to the service using packet switching in determination block 508. If neither SIM also supports a service that uses circuit switching (i.e., determination block 508="No"), the wireless device processor may perform operations of the method 400 in order to prioritize between the supported packet-switching services.

If at least one SIM supports a service that uses circuit-switched communications as well as supporting the service that uses packet-switched communications, in determination block 510 the wireless device processor may determine whether both SIMs support services that use circuit switching in addition to supporting services that use packet switching. If only one SIM supports both a circuit switching service and a packet switching service (i.e., determination block 510="No"), the wireless device processor may prioritize or assign the SIM that supports both circuit and packet switching as SIM-2, with the SIM that supports only packet switching prioritized or assigned as SIM-1. Accordingly, the wireless device processor may return to the operations of block 308 of the method 300.

If both SIMs support circuit-switching services as well as supporting packet-switching services (i.e., determination block 510="Yes"), the wireless device processor may perform operations of the method 400 in order to prioritize between supported services of the same type. For example, the wireless device processor may be configured such that if both SIMs support circuit-switched and packet-switched services, operations of method 400 are selectively performed with respect to the circuit-switching services, thereby prioritizing the SIMs based only on relative criticality of their circuit-switching services. In an alternative example, the wireless device processor may be configured such that if both SIMs support circuit and packet switching, operations of the method 400 are selectively performed with respect to the packet-switching services, thereby prioritizing the SIMs based only on relative criticality of their packet-switching services.

If only one SIM supports a service that uses packet switching (i.e., determination block 506="No"), then in block 512, the wireless device processor may prioritize/assign the SIM that supports the packet-switched service as SIM-1, with the other SIM prioritized/assigned as SIM-2. In some embodiments, the wireless device processor may be configured to assume that the SIM that does not support packet-switching services instead supports services that use circuit switching and/or services for which the communication mode may be unknown, both of which may be prioritized over a packet-switched service. As such, in the case of block 512, the SIMs may be prioritized without determining whether either or both SIMs support any time critical service (i.e., use circuit switching).

In some embodiments, the wireless device processor may return to performing the operations block 306 of the method 300. In other embodiments, the wireless device processor may further optimize network registration of the prioritized SIMs according to method 550 illustrated in FIG. 5B. With reference to FIGS. 1-5B, in the method 550, the wireless device processor may use additional network information, including support for services that use circuit switching (or other time critical characteristics), to adjust how the modem stacks of SIM-1 and SIM-2 register on their respective networks.

In determination block 516, the wireless device processor may determine whether SIM-1 supports a service that uses circuit switching (i.e., a predefined time critical service) in addition to supporting the packet-switched communication service identified in determination block 506. If SIM-1 does not support a service that uses circuit switching (i.e., determination block 516="No"), the wireless device processor may return to performing the operations of block 308 of the method 300. If SIM-1 does support a service that uses circuit switching in addition to the packet-switched service (i.e., determination block 516="Yes"), the wireless device processor may determine whether the network acquired by the modem stack associated with SIM-1 supports a combined attach procedure for circuit-switched and packet-switched services in determination block 518.

In various embodiments, coordination between network registration for circuit-switched and packet-switched services may be implemented by an interface between the MSC of the GSM core network and the serving GPRS support node of the GPRS core network. In a first network mode of operation (NMO I), the wireless device processor may initiate a combined IMSI and GPRS attach procedure, which may allow simultaneous registration of both circuit-switched and packet-switched services (see 3GPP TS 23.060 version 8.5.1 Release 8). The combined attach procedure may require less signaling and prolong battery life on the wireless device than separately registering. Alternatively, in a second or third network mode of operation (NMO II or NMO III), separate attach procedures may be required for circuit switched and packet switched services (i.e., IMSI attach and GPRS attach, respectively).

If a selected network has been acquired and camped on by the modem stack of SIM-1, and the selected network supports a combined attach procedure (i.e., determination block 518="Yes"), the wireless device processor may allow SIM-1 to register on the selected network for both circuit-switched and packet-switched services by performing the combined attach in block 520. Registration on the network for both circuit-switched and packet-switched services may involve, for example, sending an attach request to the SGSN for both types of communications, from which an IMSI attach request may be forwarded to the MSC.

In block 522, the wireless device processor may receive, from the modem stack of SIM-1, a request to use the radio resource for a packet-switched communication service (i.e., a predefined non-critical service). Such a request may be initiated by a user, or may be initiated automatically by an application running on the wireless device.

In determination block 524, prior to granting the request for use of the radio resource to the modem stack associated with SIM-1, the wireless device processor may determine whether SIM-2 has successfully registered with a selected network. If the modem stack of SIM-2 has not successfully registered with a selected network (i.e., determination block 524="No"), the wireless device processor may prevent the modem stack associated with SIM-1 from using the radio resource to begin the desired active packet-switched communication in block 526. The wireless device processor may return to determination block 524 to reevaluate the status of network registration by the modem stack of SIM-2, for example, following expiration of a countdown timer.

If the modem stack of SIM-2 has successfully registered with its network (i.e., determination block 524="Yes"), the wireless device processor may grant radio use to the modem stack associated with SIM-1 to initiate the active packet-switched communication requested on its network in block 528. In other embodiments, the wireless device processor may increment a counter upon every repetition of blocking the modem stack associated with SIM-1 from using the radio resource in block 526. Upon reaching a preset limit, instead of returning to determination block 524, the wireless device processor may grant radio access to the modem stack associated with SIM-1 to enable packet switch communications in block 528.

Thus according to various embodiments, the wireless device may take advantage of the power and radio resource savings provided by a combined attach procedure on SIM-1, but may still avoid overuse of the radio resource for a non-time critical service (i.e., packet switched service) by preventing the SIM-1 modem stack from active communications to send or receive data until registration of the modem stack associated with SIM-2 on its network.

If the modem stack associated with SIM-1 has not acquired and camped on a cell of a selected network and/or the selected network does not support a combined attach procedure for circuit switched and packet switched services (i.e., determination block 518="No"), such as in NMO II or NMO III, the wireless device processor may allow the modem stack associated with SIM-1 to register only for services that use circuit switching (i.e., predefined time critical services) by allowing the modem stack to perform only the IMSI attach procedure in block 530. If the modem stack associated with SIM-1 has not acquired and camped on a cell of the selected network, the operations of block 530 may also include initial acquisition and cell selection steps prior to performing the IMSI attach.

In determination block 532, before allowing the modem stack of SIM-1 to register with the network for packet-switched services (e.g., by a GPRS attach), the wireless device processor may determine whether the modem stack associated with SIM-2 has successfully registered with its selected network. If the modem stack associated with SIM-2 has not successfully registered with its network (i.e., determination block 532="No"), the wireless device processor may prevent the modem stack of SIM-1 from registering for packet-switched services by preventing a GPRS attach request on SIM-1 in block 534. The wireless device processor may return to determination block 532 to reevaluate the registration status of the modem stack associated with SIM-2, for example, following expiration of a countdown timer.

If the modem stack associated with SIM-2 has successfully registered with the network (i.e., determination block 532="Yes"), the wireless device processor may allow the modem stack associated with SIM-1 to register on the network for GPRS services (i.e. by performing a GPRS attach) in block 536. In other embodiments, the wireless device processor may increment a counter upon every repetition of preventing a GPRS attach request on SIM-1 in block 534. Upon reaching a preset limit, instead of returning to determination block 532, the wireless device processor may allow the modem stack associated with SIM-1 to register with its network in block 536.

As discussed above, the references to SIM-1 and SIM-2, as well as to a first network, second network, etc., are arbitrary, and may apply to either or any SIM and/or network of the wireless device.

Figure 6:
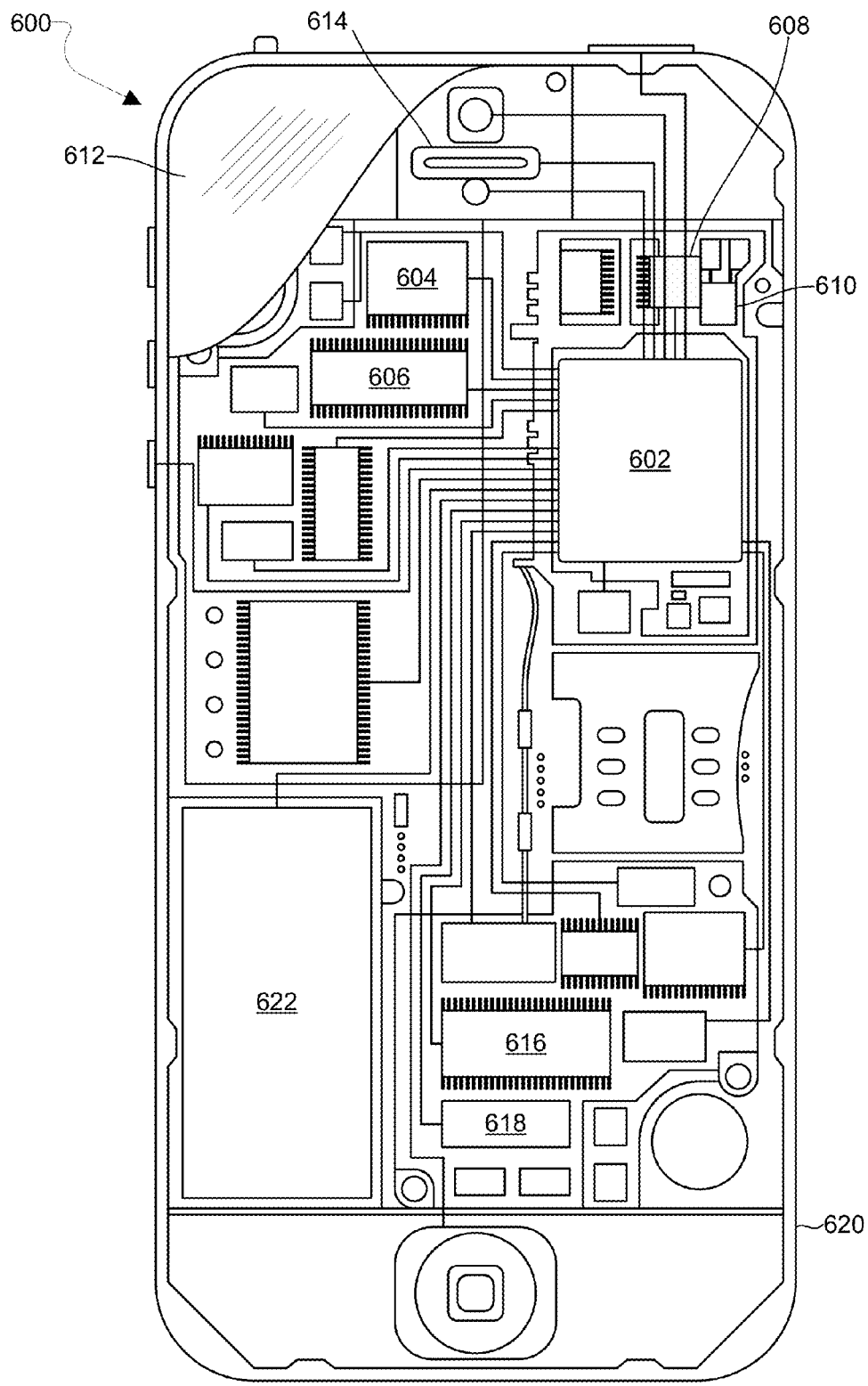
FIG. 6 is a component diagram of an example wireless device suitable for use with various embodiments of the disclosure.

The various embodiments may be implemented in any of a variety of wireless devices 200, an example (600) of which is illustrated in FIG. 6. For example, the wireless device 600 may include a processor 602 coupled to a touchscreen controller 604 and an internal memory 606. The processor 602 may be one or more multicore ICs designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may have one or more radio signal transceivers 608 (e.g., Peanut®, Bluetooth®, Zigbee®, Wi-Fi, RF radio) and antennae 610, for sending and receiving, coupled to each other and/or to the processor 602. The transceivers 608 and antennae 610 may be used with the above-mentioned circuitry to implement the various wireless transmission protocol stacks and interfaces. The multicore device 600 may include a cellular network wireless modem chip 616 that enables communication via a cellular network and is coupled to the processor. The multicore device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe.

The peripheral device connection interface 618 may also be coupled to a similarly configured peripheral device connection port (not shown). The multicore device 600 may also include speakers 614 for providing audio outputs. The multicore device 600 may also include a housing 620, constructed of a plastic, metal, or a combination of materials, for containing all or some of the components discussed herein. The multicore device 600 may include a power source 622 coupled to the processor 602, such as a disposable or rechargeable battery. The rechargeable battery may also be coupled to the peripheral device connection port to receive a charging current from a source external to the multicore device 600.

Figure 7:
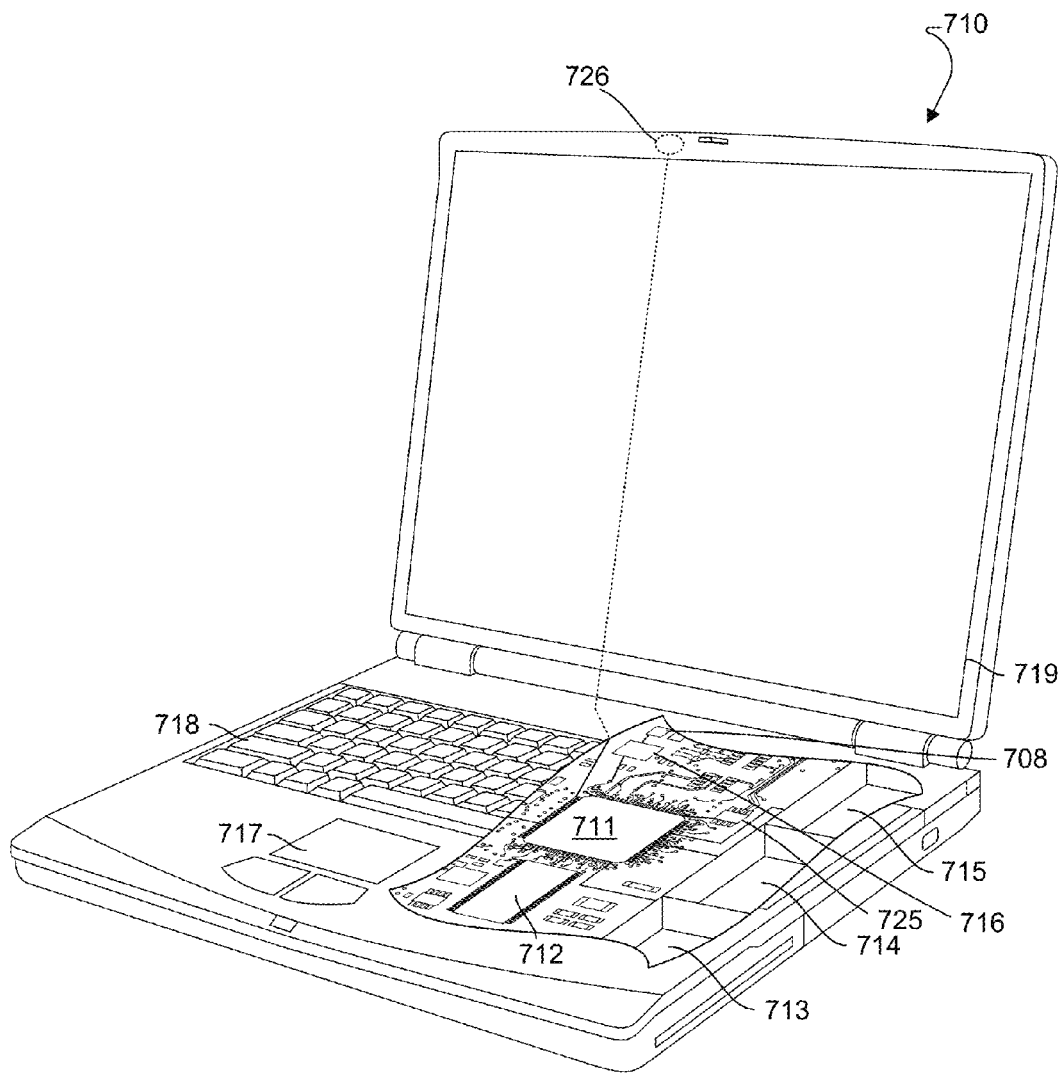
FIG. 7 is a component diagram of another example wireless device suitable for use with various embodiments of the disclosure.

The various embodiments described above may also be implemented within a variety of personal computing devices, such as a laptop computer 700 as illustrated in FIG. 7. Many laptop computers include a touch pad touch surface 717 that serves as the computer's pointing device, and thus may receive drag, scroll, and flick gestures similar to those implemented on wireless computing devices equipped with a touch screen display and described above. A laptop computer 700 will typically include a processor 711 coupled to volatile memory 712 and a large capacity nonvolatile memory, such as a disk drive 713 of Flash memory. The computer 700 may also include a floppy disc drive 714 and a compact disc (CD) drive 715 coupled to the processor 711. The computer 700 may also include a number of connector ports coupled to the processor 711 for establishing data connections or receiving external memory devices, such as a USB or FireWire® connector sockets, or other network connection circuits for coupling the processor 711 to a network. In a notebook configuration, the computer housing includes the touchpad 717, the keyboard 718, and the display 719 all coupled to the processor 711. Other configurations of the computing device may include a computer mouse or trackball coupled to the processor (e.g., via a USB input) as are well known, which may also be use in conjunction with the various embodiments.

The processors 602, 711 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 606, 712, 713 before they are accessed and loaded into the processors 602, 711. Processors 602, 711 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602, 711, including internal memory or removable memory plugged into the device and memory within the processor 602, 711, themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing a multiple subscriber identification module (multi-SIM) wireless communication device having at least a first SIM and a second SIM sharing a single radio resource, comprising:
    evaluating criticality of communication services supported by each of the first SIM and the second SIM by identifying, among the first and second SIMs, a SIM supporting higher criticality communication services and a SIM supporting lower criticality communication services;
    granting use of the radio resource to a modem stack associated with the SIM supporting the higher criticality communication services;
    determining whether the SIM supporting the higher criticality communication services has successfully registered in a first selected network;
    allowing the SIM supporting the lower criticality communication services to register for service in a second selected network in response to determining that the SIM supporting the higher criticality communication services has registered in the first selected network; and
    preventing the SIM supporting the lower criticality communication services from registering in the second selected network in response to determining that the SIM supporting the higher criticality communication services has not successfully registered in the first selected network.

2. The method of claim 1, wherein allowing the SIM supporting the lower criticality communication services to register in the second selected network in response to determining that the SIM supporting the higher criticality communication services has registered in a first selected network comprises:
    granting use of the radio resource to a modem stack associated with the SIM supporting the lower criticality communication services;
    identifying a public land mobile network (PLMN) selected according to a predetermined priority list; and
    sending signals to, and receiving signals from, the selected PLMN to perform a location update.

3. The method of claim 1, wherein identifying, among the first and second SIMs, a SIM supporting higher criticality communication services and a SIM supporting lower criticality communication services comprises:
    inputting a first service supported by the first SIM to a criticality index generator;
    outputting a criticality index value for the first service;
    inputting a second service supported by the second SIM to the criticality index generator;
    outputting a criticality index value for the second service;
    comparing the output criticality index values for the first and second services; and
    identifying a service associated with a highest criticality, wherein the service associated with the highest criticality is the service with a lowest output criticality index value.

4. The method of claim 1, wherein identifying, among the first and second SIMs, a SIM supporting higher criticality communication services and a SIM supporting lower criticality communication services comprises:
    accessing a predefined criticality list stored on the multi-SIM wireless communication device, wherein the predefined criticality list comprises at least one category of predefined time critical services and at least one category of predefined non-time critical services; and
    determining, for each of the supported communication services, whether the service is within one of the at least one category of predefined time critical services based on whether the service matches a service characteristic.

5. The method of claim 4, wherein:
identifying, among the first and second SIMs, a SIM supporting higher criticality communication services and a SIM supporting lower criticality communication services comprises accessing the predefined criticality list stored on the multi-SIM wireless communication device;
the at least one category of predefined time critical services comprises circuit-switched communication services;
the at least one category of predefined non-time critical services comprises packet-switched communication services, wherein the SIM supporting the lower criticality services supports at least one packet-switched communication service; and
determining, for each of the supported communication services, whether the service is within the one of the at least one category of predefined time critical services based on whether the service matches the service characteristic comprises determining whether the service uses circuit switching.

6. The method of claim 5, further comprising:
determining whether the SIM supporting the lower criticality communication services also supports at least one circuit-switched communication service;
determining whether the second selected network supports a combined attach procedure in response to determining that the SIM supporting the lower criticality communication services also supports at least one circuit-switched communication service;
in response to determining that the second selected network supports a combined attach procedure:
    permitting the SIM supporting the lower criticality communication services to perform a combined attach to register in the second selected network for both circuit-switched and packet-switched services; and
    preventing the SIM supporting the lower criticality communication services from initiating a mobile originating communication on a packet-switched service until the SIM supporting the higher criticality communication services has successfully registered in the first selected network; and
in response to determining that the second selected network does not support a combined attach procedure:
    allowing the SIM supporting the lower criticality communication services to register for service in a circuit-switched domain of the second selected network; and
    preventing the SIM supporting the lower criticality communication services from registering for service in a packet-switched domain of the second selected network until the SIM supporting the higher criticality communication services has successfully registered in the first selected network.

7. A wireless communication device, comprising:
   a radio resource associated with a first subscriber identification module (SIM) and a second SIM; and
   a processor coupled to the first and second SIMs and the radio resource, wherein the processor is configured to:
   evaluate criticality of communication services supported by each of the first SIM and the second SIM by identifying, among the first and second SIMs, a SIM supporting higher criticality communication services and a SIM supporting lower criticality communication services; grant use of the radio resource to a modem stack associated with the SIM supporting the higher criticality communication services;
   determine whether the SIM supporting the higher criticality communication services has successfully registered in a first selected network;
   allow the SIM supporting the lower criticality communication services to register in a second selected network in response to determining that the SIM supporting the higher criticality communication services has registered in the first selected network; and
   prevent the SIM supporting the lower criticality communication services from registering in the second selected network in response to determining that the SIM supporting the higher criticality communication services has not successfully registered in the first selected network.

8. The wireless communication device of claim 7, wherein the processor is further configured to allow the SIM supporting the lower criticality communication services to register in the second selected network by:
   granting use of the radio resource to a modem stack associated with the SIM supporting the lower criticality communication services;
   identifying a public land mobile network (PLMN) selected according to a predetermined priority list; and
   sending signals to, and receiving signals from, the selected PLMN to perform a location update.

9. The wireless communication device of claim 7, wherein the processor is further configured to:
   input a first service supported by the first SIM to a criticality index generator;
   output a criticality index value for the first service;
   input a second service supported by the second SIM to the criticality index generator;
   output a criticality index value for the second service;
   compare the output criticality index values for the first and second services; and
   identify a service associated with a highest criticality, wherein the service associated with the highest criticality is the service with a lowest output criticality index value.

10. The wireless communication device of claim 7, wherein the processor is further configured to:
    access a predefined criticality list stored on the wireless communication device, wherein the predefined criticality list comprises at least one category of predefined time critical services and at least one category of predefined non-time critical services; and
    determine, for each of the supported communication services, whether the service is within one of the at least one category of predefined time critical services based on whether the service matches a service characteristic.

11. The wireless communication device of claim 10, wherein:
    the processor is further configured to identify, among the first and second SIMs, a SIM supporting higher criticality communication services and a SIM supporting lower criticality communication services by accessing the predefined criticality list stored on the wireless communication device, wherein the at least one category of predefined time critical services comprises circuit-switched communication services;
    the at least one category of predefined non-time critical services comprises packet-switched communication services;
    the SIM supporting the lower criticality communication services supports at least one packet-switched communication service; and
    the processor is further configured to determine, for each of the supported communication services, whether the service is within the one of the at least one category of predefined time critical services based on whether the service matches the service characteristic by determining whether the service uses circuit switching.

12. The wireless communication device of claim 11, wherein the processor is further configured to:
    determine whether the SIM supporting the lower criticality communication services also supports at least one circuit-switched communication service;
    determine whether the second selected network supports a combined attach procedure in response to determining that the SIM supporting the lower criticality communication services also supports at least one circuit-switched communication service;
    in response to determining that the second selected network supports a combined attach procedure:
       permit the SIM supporting the lower criticality communication services to perform a combined attach to register in the second selected network for both circuit-switched and packet-switched services; and
       prevent the SIM supporting the lower criticality communication services from initiating a mobile originating communication on a packet-switched service until the SIM supporting the higher criticality communication services has successfully registered in the first selected network; and
    in response to determining that the second selected network does not support a combined attach procedure:
       allow the SIM supporting the lower criticality communication services to register for service in a circuit-switched domain of the second selected network; and
       prevent the SIM supporting the lower criticality communication services from registering in a packet-switched domain of the second selected network until the SIM supporting the higher criticality communication services has successfully registered in the first selected network.

13. A wireless communication device, comprising:
    means for evaluating criticality of communication services supported by each of a first subscriber identification module (SIM) and a second SIM, wherein the first and second SIMs are both associated with a radio resource comprising means for identifying, among the first and second SIMs, a SIM supporting higher criticality communication services and a SIM supporting lower criticality communication services;
    means for granting use of the radio resource to a modem stack associated with the SIM supporting the higher criticality communication services;
    means for determining whether the SIM supporting the higher criticality communication services has successfully registered in a first selected network;

means for allowing the SIM supporting the lower criticality communication services to register in a second selected network in response to determining that the SIM supporting the higher criticality communication services has registered in the first selected network; and means for preventing the SIM supporting the lower criticality communication services from registering in the second selected network in response to determining that the SIM supporting the higher criticality communication services has not successfully registered in the first selected network.

14. A non-transitory processor-readable medium having stored thereon processor-executable instructions configured to cause a wireless communication device processor to perform operations comprising:

evaluating criticality of communication services supported by each of a first subscriber identification module (SIM) and a second SIM, wherein the first and second SIMs are both associated with a radio resource of the wireless communication device by identifying, among the first and second SIMs, a SIM supporting higher criticality communication services and a SIM supporting lower criticality communication services;

granting use of the radio resource to a modem stack associated with the SIM supporting the higher criticality communication services;

determining whether the SIM supporting the higher criticality communication services has successfully registered in a first selected network;

allowing the SIM supporting the lower criticality communication services to register in a second selected network in response to determining that the SIM supporting the higher criticality communication services has registered in the first selected network; and preventing the SIM supporting the lower criticality communication services from registering in the second selected network in response to determining that the SIM supporting the higher criticality communication services has not successfully registered in the first selected network.

15. The non-transitory processor-readable medium of claim 14, wherein the stored processor-executable instructions are configured to cause the wireless communication device processor to perform operations such that allowing the SIM supporting the lower criticality communication services to register in the second selected network in response to determining that the SIM supporting the higher criticality communication services has registered in a first selected network comprises:

granting use of the radio resource to a modem stack associated with the SIM supporting the lower criticality communication services;

identifying a public land mobile network (PLMN) selected according to a predetermined priority list; and sending signals to, and receiving signals from, the selected PLMN to perform a location update.

16. The non-transitory processor-readable medium of claim 14, wherein the stored processor-executable instructions are configured to cause the wireless communication device processor to perform operations such that identifying, among the first and second SIMs, a SIM supporting higher criticality communication services and a SIM supporting lower criticality communication services comprises:

inputting a first service supported by the first SIM to a criticality index generator;

outputting a criticality index value for the first service;

inputting a second service supported by the second SIM to the criticality index generator;

outputting a criticality index value for the second service;

comparing the output criticality index values for the first and second services; and identifying a service associated with a highest criticality, wherein the service associated with the highest criticality is the service with a lowest output criticality index value.

17. The non-transitory processor-readable medium of claim 14, wherein the stored processor-executable instructions are configured to cause the wireless communication device processor to perform operations such that identifying, among the first and second SIMs, a SIM supporting higher criticality communication services and a SIM supporting lower criticality communication services comprises:

accessing a predefined criticality list stored on the wireless communication device, wherein the predefined criticality list comprises at least one category of predefined time critical services and at least one category of predefined non-time critical services; and determining, for each of the supported communication services, whether the service is within one of the at least one category of predefined time critical services based on whether the service matches a service characteristic.

18. The non-transitory processor-readable medium of claim 17, wherein:

the stored processor-executable instructions are configured to cause the wireless communication device processor to perform operations such that identifying, among the first and second SIMs, a SIM supporting higher criticality communication services and a SIM supporting lower criticality communication services comprises accessing the predefined criticality list stored on the wireless communication device;

the at least one category of predefined time critical services comprises circuit-switched communication services;

the at least one category of predefined non-time critical services comprises packet-switched communication services, wherein the SIM supporting the lower criticality services supports at least one packet-switched communication service; and determining, for each of the supported communication services, whether the service is within the one of the at least one category of predefined time critical services based on whether the service matches the service characteristic comprises determining whether the service uses circuit switching.

19. The non-transitory processor-readable medium of claim 18, wherein the stored processor-executable instructions are configured to cause the wireless communication device processor to perform operations further comprising:

determining whether the SIM supporting the lower criticality communication services also supports at least one circuit-switched communication service;

determining whether the second selected network criticality supports a combined attach procedure in response to determining that the SIM supporting the lower criticality communication services also supports at least one circuit-switched communication service;

in response to determining that the second selected network supports a combined attach procedure:

permitting the SIM supporting the lower criticality communication services to perform a combined attach to register in the second selected network for both circuit-switched and packet-switched services; and preventing the SIM supporting the lower criticality communication services from initiating a mobile originating communication on a packet-switched service until the SIM supporting the higher criticality communication services has successfully registered in the first selected network; and in response to determining that the second selected network does not support a combined attach procedure:

allowing the SIM supporting the lower criticality communication services to register for service in a circuit-switched domain of the second selected network; and preventing the SIM supporting the lower criticality communication services from registering in a packet-switched domain of the second selected network until the SIM supporting the higher criticality communication services has successfully registered in the first selected network.

* * * * *